United States Patent
Akeboshi (10) Patent No.: US 11,683,207 B2
(45) Date of Patent: Jun. 20, 2023

(54) OFDM MODULATION DEVICE AND OFDM DEMODULATION DEVICE

(71) Applicant: Mitsubishi Electric Corporation, Tokyo (JP)

(72) Inventor: Yoshihiro Akeboshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/979,324

(22) Filed: Nov. 2, 2022

(65) Prior Publication Data

US 2023/0052936 A1  Feb. 16, 2023

Related U.S. Application Data

(63) Continuation of application No. PCT/JP2020/027269, filed on Jul. 13, 2020.

(51) Int. Cl.
*H04L 27/26* (2006.01)

(52) U.S. Cl.
CPC ........ *H04L 27/2602* (2013.01); *H04L 27/265* (2013.01); *H04L 27/2628* (2013.01)

(58) Field of Classification Search
CPC ....................... H04L 27/2602; H04L 27/2628; H04L 27/265
See application file for complete search history.

(56) References Cited

U.S. PATENT DOCUMENTS

| | | |
|---|---|---|
| 2016/0043830 A1 | 2/2016 | Simon et al. |
| 2017/0054581 A1 | 2/2017 | Simon et al. |
| 2018/0131550 A1 | 5/2018 | Simon et al. |
| 2019/0268195 A1 | 8/2019 | Simon et al. |
| 2020/0252251 A1 | 8/2020 | Simon et al. |
| 2022/0141063 A1 | 5/2022 | Simon et al. |

FOREIGN PATENT DOCUMENTS

| | | |
|---|---|---|
| JP | 2015-211435 A | 11/2015 |
| JP | 2016-184814 A | 10/2016 |
| JP | 2017-525300 A | 8/2017 |

OTHER PUBLICATIONS

International Search Report for PCT/JP2020/027269 (PCT/ISA/210) dated Oct. 13, 2020.

(Continued)

*Primary Examiner* — Curtis B Odom
(74) *Attorney, Agent, or Firm* — Birch, Stewart, Kolasch & Birch, LLP (57) ABSTRACT

An OFDM modulation device includes a communication use specifying unit to specify a communication use of a communication frame, a header generating unit to generate a header of the communication frame in which communication use specifying information indicating the communication use specified by the communication use specifying unit is stored, a payload generating unit to generate a payload of the communication frame, and an inverse fast Fourier transform unit to generate a communication frame of time domain by executing an inverse fast Fourier transform of a size corresponding to the communication use specified by the communication use specifying unit on data of frequency domain including the header generated by the header generating unit and the payload generated by the payload generating unit.

4 Claims, 5 Drawing Sheets

(56) References Cited

OTHER PUBLICATIONS

Kuo et al., "VLSI Design of a Variable-Length FFT/IFFT Processor for OFDM-Based Communication Systems", EURASIP Journal on Applied Signal Processing, Dec. 24, 2003, vol. 2003, pp. 1306-1316, https://asp-eurasipjournals.springeropen.com/articles/10.1155/S1110865703309060.
Written Opinion of the International Searching Authority for PCT/JP2020/027269 (PCT/ISA/237) dated Oct. 13, 2020.

OFDM MODULATION DEVICE AND OFDM DEMODULATION DEVICE

CROSS REFERENCE TO RELATED APPLICATIONS

This application is a Continuation of PCT International Application No. PCT/JP2020/027269, filed on Jul. 13, 2020, all of which is hereby expressly incorporated by reference into the present application.

TECHNICAL FIELD

The present disclosure relates to an OFDM modulation device and an OFDM demodulation device.

BACKGROUND ART

Patent Literature 1 discloses a transmitter and a plurality of receivers that adopt a modulation and demodulation system of orthogonal frequency division multiplexing (OFDM). The transmitter simultaneously transmits information to a plurality of receivers by allocating a subcarrier to each receiver and simultaneously transmitting a plurality of subcarriers.

CITATION LIST

Patent Literatures

Patent Literature 1: JP 2016-184814 A

SUMMARY OF INVENTION

Technical Problem

In the technology disclosed in Patent Literature 1, for example, even when a transmitter transmits a small-capacity control signal only to any one of a plurality of receivers, there is a problem that unused subcarriers other than the subcarrier allocated to the receiver need to be simultaneously transmitted. That is, there is a problem that the number of subcarriers cannot be changed even when a communication use of the signal transmitted from the transmitter to the receiver is changed.

The present disclosure has been made to solve the above problems, and an object thereof is to provide a technology capable of changing the number of subcarriers when the communication use is changed.

Solution to Problem

An OFDM modulation device according to the present disclosure includes a communication use specifier to specify a communication use of a communication frame;

a header generator to generate a header of the communication frame in which communication use specifying information indicating the communication use specified by the communication use specifier is stored;

a payload generator to generate a payload of the communication frame; and an inverse fast Fourier transformer to generate a communication frame of time domain by executing an inverse fast Fourier transform of a size corresponding to the communication use specified by the communication use specifier on data of frequency domain including the header generated by the header generator and the payload generated by the payload generator, wherein the communication use specified by the communication use specifier is a control use or an information use, and the size of the inverse fast Fourier transform executed by the inverse fast Fourier transformer when the communication use specified by the communication use specifier is the control use is smaller than the size of the inverse fast Fourier transform executed by the inverse fast Fourier transformer when the communication use specified by the communication use specifier is the information use.

Advantageous Effects of Invention

According to the present disclosure, the number of subcarriers can be changed when the communication use is changed.

DESCRIPTION OF EMBODIMENTS

An embodiment for carrying out the present disclosure is hereinafter described with reference to the attached drawings in order to describe the present disclosure in further detail.

First Embodiment

Figure 1:
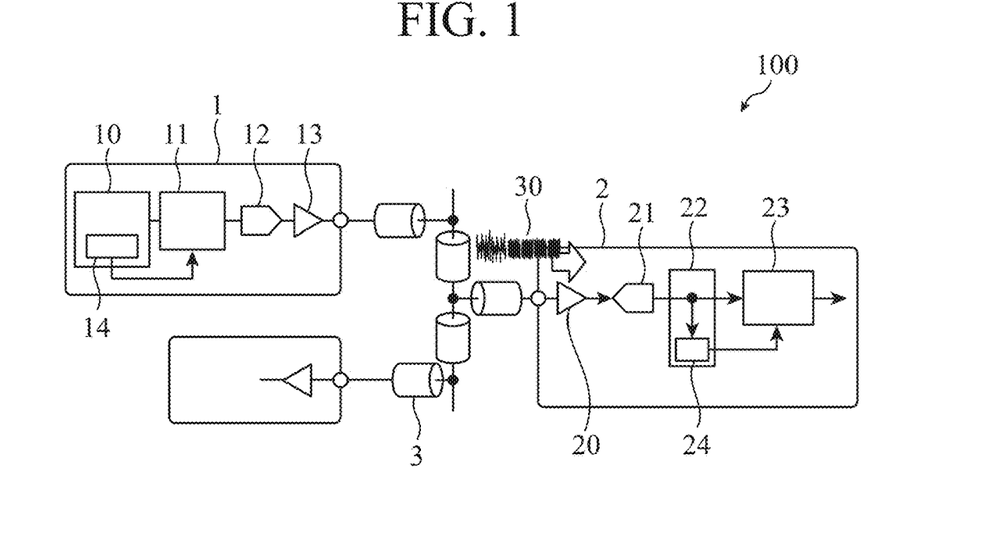
FIG. 1 is a block diagram illustrating a configuration of an OFDM communication system according to a first embodiment.

FIG. 1 is a block diagram illustrating a configuration of an OFDM communication system 100 according to a first embodiment. As illustrated in FIG. 1, the OFDM communication system 100 includes an OFDM modulation device 1, an OFDM demodulation device 2, and a cable 3. Note that, the OFDM communication system 100 further includes at least one or more OFDM demodulation devices having a configuration similar to a configuration of the OFDM demodulation device 2 in addition to the OFDM demodulation device 2. The OFDM modulation device 1 is connected to the OFDM demodulation device 2 and at least one or more other OFDM demodulation devices via the cable 3.

Figure 2:
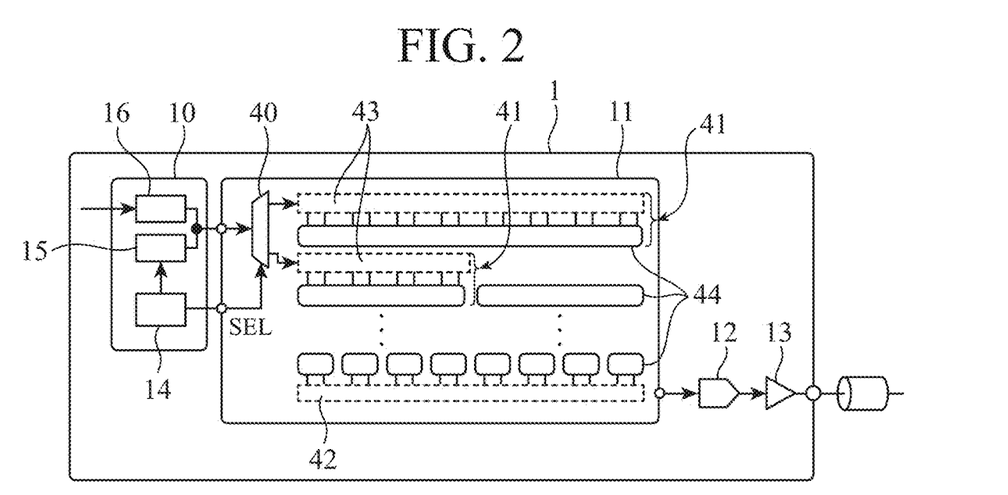
FIG. 2 is a block diagram illustrating a detailed configuration of an OFDM modulation device according to the first embodiment.

FIG. 2 is a block diagram illustrating a detailed configuration of the OFDM modulation device 1 according to a first embodiment. As illustrated in FIG. 1 or 2, the OFDM modulation device 1 is provided with a communication frame generating unit 10, an inverse fast Fourier transform unit 11, a DA converter 12, and an amplifying element 13. Note that, although it is described later in detail, as illustrated in FIG. 1, the OFDM demodulation device 2 is provided with an amplifying element 20, an AD converter 21, a symbol synchronization unit 22, and a fast Fourier transform unit 23. The symbol synchronization unit 22 is provided with a communication use determining unit 24.

The communication frame generating unit 10 generates a communication frame to be transmitted from the OFDM modulation device 1 to the OFDM demodulation device 2.

In further detail, the communication frame generating unit 10 is provided with a communication use specifying unit 14, a header generating unit 15, and a payload generating unit 16.

The communication use specifying unit 14 specifies a communication use of the communication frame. The communication use specifying unit 14 outputs information indicating the specified communication use to each of the header generating unit 15 and the inverse fast Fourier transform unit 11. Examples of the communication use specified by the communication use specifying unit 14 include a control use, an information use or the like. Herein, the control use is, for example, a control use to control a single device (one control target), a control use to control each of a plurality of devices (a plurality of control targets) or the like. Note that, in the first embodiment, the "control use" is intended to mean the control use to control a single device. That is, in the first embodiment, the communication frame of the control use is a control signal for controlling an apparatus (not illustrated) provided with the OFDM demodulation device 2. In the first embodiment, the communication frame of the information use is data having an information amount larger than that of the control signal. Examples of the data include image data, audio data or the like.

The header generating unit 15 generates a header of the communication frame. When generating the header, the header generating unit 15 stores communication use specifying information indicating the communication use specified by the communication use specifying unit 14 in the header. The header generating unit 15 outputs the header in which the communication use specifying information is stored to the inverse fast Fourier transform unit 11.

The payload generating unit 16 generates a payload of the communication frame. The payload generating unit 16 outputs the generated payload to the inverse fast Fourier transform unit 11.

The inverse fast Fourier transform unit 11 generates a communication frame of time domain by executing an inverse fast Fourier transform of a size corresponding to the communication use specified by the communication use specifying unit 14 on data of frequency domain including the header generated by the header generating unit 15 and the payload generated by the payload generating unit 16. Note that, at that time, the inverse fast Fourier transform unit 11 executes the inverse fast Fourier transform for each symbol on the data of frequency domain. Herein, the size is intended to mean the number of input bits (the number of samples) of the inverse fast Fourier transform. The inverse fast Fourier transform unit 11 outputs the generated communication frame of time domain to the DA converter 12.

Regarding the size of the inverse fast Fourier transform executed by the inverse fast Fourier transform unit 11, for example, the size of the inverse fast Fourier transform executed by the inverse fast Fourier transform unit 11 when the communication use specified by the communication use specifying unit 14 is the control use is smaller than the size of the inverse fast Fourier transform executed by the inverse fast Fourier transform unit 11 when the communication use specified by the communication use specifying unit 14 is the information use. In another example, for example, the size of the inverse fast Fourier transform executed by the inverse fast Fourier transform unit 11 when the communication use specified by the communication use specifying unit 14 is the control use to control a single device is smaller than the size of the inverse fast Fourier transform executed by the inverse fast Fourier transform unit 11 when the communication use specified by the communication use specifying unit 14 is the control use to control each of a plurality of devices.

The DA converter 12 converts the communication frame of time domain generated by the inverse fast Fourier transform unit 11 from digital data to analog data. The DA converter 12 outputs the communication frame of time domain converted to the analog data to the amplifying element 13.

The amplifying element 13 amplifies the communication frame of time domain converted to the analog data by the DA converter 12. The amplifying element 13 outputs the amplified communication frame 30 of time domain to the OFDM demodulation device 2.

Figure 3:
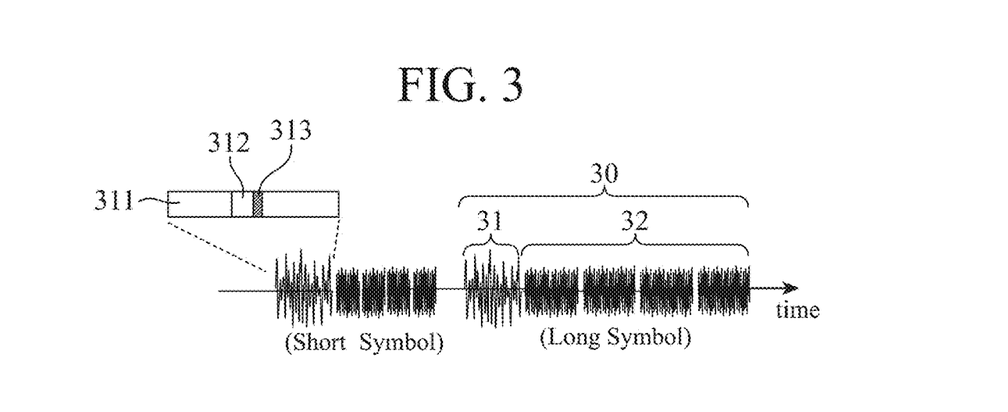
FIG. 3 is a diagram illustrating a specific example of a communication frame of time domain transmitted by the OFDM modulation device according to the first embodiment to an OFDM demodulation device according to the first embodiment.

FIG. 3 is a diagram illustrating a specific example of the communication frame 30 of time domain transmitted by the OFDM modulation device 1 to the OFDM demodulation device 2. In FIG. 3, amplitude is plotted along the vertical axis, and time is plotted along the horizontal axis. As illustrated in FIG. 3, in this specific example, the communication frame 30 includes a plurality of symbols, includes a header symbol 31 being the header generated by the header generating unit 15 and a plurality of payload symbols 32 being the payloads generated by the payload generating unit 16. Note that, the description of short symbol and long symbol in FIG. 3 will be described later.

In this specific example, the header symbol 31 generated by the header generating unit 15 stores a preamble 311 for the OFDM demodulation device 2 to perform symbol synchronization, an address bit area 312 in which a transfer destination address, a transfer source address or the like is stored, and other information essential for communication control. In the header symbol 31, a communication use bit area 313 for storing the communication use specifying information described above is determined in advance. The communication use specifying information stored in the communication use bit area 313 of the header symbol 31 indicates, for example, whether the communication use of the communication frame 30 is the control use or the information use. Communication data actually transmitted between the OFDM modulation device 1 and the OFDM demodulation device 2 is stored in the payload symbol 32. For example, when the communication use of the communication frame 30 is the control use, the communication data is a control signal. For example, when the communication use of the communication frame 30 is the information use, the communication data is the image data and the like having the information amount larger than that of the control signal.

Figure 4:
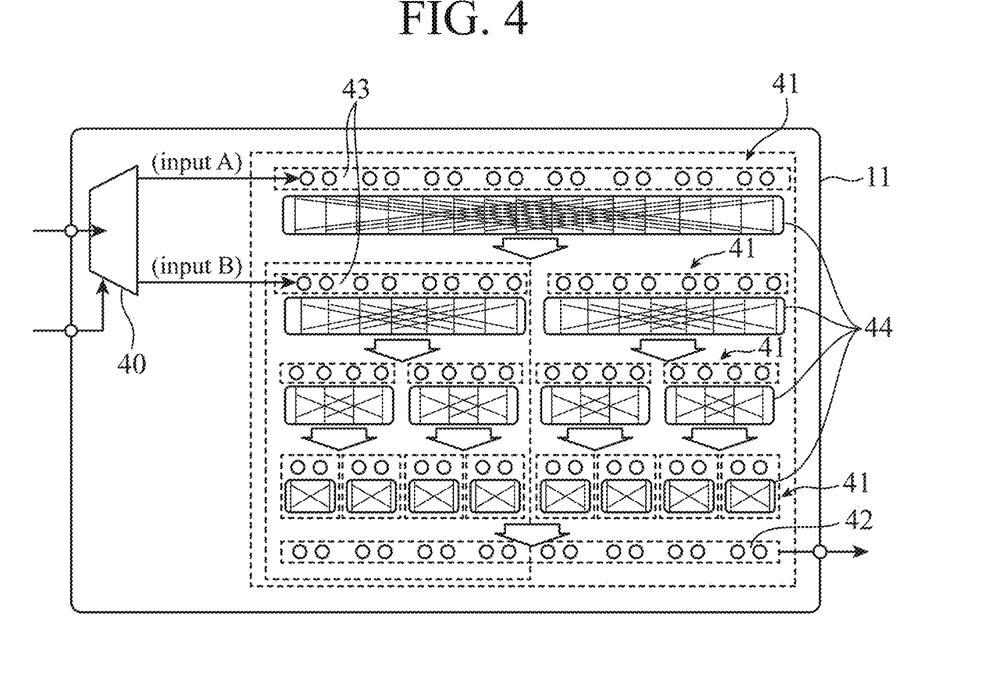
FIG. 4 is a diagram illustrating a detailed configuration of an inverse fast Fourier transform unit of the OFDM modulation device according to the first embodiment.

Hereinafter, a detailed configuration of the inverse fast Fourier transform unit 11 of the OFDM modulation device 1 according to the first embodiment will be described. FIG. 4 is a diagram illustrating a detailed configuration of the inverse fast Fourier transform unit 11 of the OFDM modulation device 1.

As illustrated in FIG. 2 or 4, the inverse fast Fourier transform unit 11 is provided with a selector 40, a plurality of layers 41, and a data output unit 42. Each of the plurality of layers 41 includes at least one or more data input units 43 and at least one or more butterfly operation units 44 that execute a butterfly operation. More specifically, for example, in an example in FIG. 4, a highest layer out of the plurality of layers 41 is provided with one data input unit 43 and one butterfly operation unit 44 that acquires data from the data input unit 43. A next highest layer (a second highest layer in FIG. 4) out of the plurality of layers 41 is provided with two data input units 43, the butterfly operation unit 44 that acquires the data from one of the two data input units 43, and the butterfly operation unit 44 that acquires the data from the other of the two data input units 43. Note that, in this specification, the "highest layer" is intended to mean the layer illustrated on the top in FIG. 4.

The selector 40 selects the data input unit 43 as an output destination to which data of frequency domain is output out of the data input units 43 of the plurality of layers 41 on the basis of the communication use specified by the communication use specifying unit 14. Note that, the data of frequency domain is the data of frequency domain including the header generated by the header generating unit 15 and the payload generated by the payload generating unit 16. The selector 40 outputs the data of frequency domain to the selected data input unit 43.

The plurality of layers 41 executes the inverse fast Fourier transform by executing the butterfly operation for each layer.

In further detail, when each data input unit 43 of the plurality of layers 41 acquires the data of frequency domain from the selector 40, this outputs the data of frequency domain to the butterfly operation unit 44 of the same layer out of the plurality of layers 41. More specifically, for example, in the example in FIG. 4, when the data input unit 43 of the highest layer out of the plurality of layers 41 acquires the data of frequency domain from the selector 40, this outputs the data of frequency domain to the butterfly operation unit 44 of the highest layer.

When each data input unit 43 of the plurality of layers 41 acquires data after the butterfly operation from the butterfly operation unit 44 of a preceding layer out of the plurality of layers 41, this outputs the data after the butterfly operation to the butterfly operation unit 44 of the same layer out of the plurality of layers 41. Note that, in this specification, the "preceding layer" is intended to mean a layer in which processing is performed before a target layer. More specifically, for example, in the example in FIG. 4, when the data input unit 43 of the next highest layer out of the plurality of layers 41 acquires the data after the butterfly operation from the butterfly operation unit 44 of the highest layer out of the plurality of layers 41, this outputs the data after the butterfly operation to the butterfly operation unit 44 of the next highest layer out of the plurality of layers 41. Note that, in this specification, a "next layer" is intended to mean a layer in which the processing is performed subsequent to a target layer.

In each butterfly operation unit 44 of the plurality of layers 41, a size of the butterfly operation to be executed is smaller as the layer to which this belongs is a later layer. In other words, each butterfly operation unit 44 of the plurality of layers 41 executes the butterfly operation of a smaller size as the layer to which this belongs is a later layer. Note that, in this specification, the "later layer" is intended to mean a layer in which the processing is performed after the target layer. Herein, the size is intended to mean the number of input bits of the butterfly operation. For example, in the example in FIG. 4, the butterfly operation unit 44 of the highest layer out of the plurality of layers 41 executes the butterfly operation with the number of input bits of 16. In contrast, the butterfly operation unit 44 of the next highest layer out of the plurality of layers 41 executes the butterfly operation with the number of input bits of 8. In this manner, in the example in FIG. 4, the butterfly operation unit 44 is configured in such a manner that the size of the butterfly operation to be executed is halved every time the number of stages of the layer to which this belongs is incremented by one. By using this, the selector 40 selects the data input unit 43 as the output destination as described above, and eventually selects the layer as the output destination out of the plurality of layers 41, so that the size of the inverse fast Fourier transform to be executed on the data of frequency domain can be changed without changing the configuration of the inverse fast Fourier transform unit 11.

In further detail, when each butterfly operation unit 44 of the plurality of layers 41 acquires the data of frequency domain from the data input unit 43 of the same layer out of the plurality of layers 41, this executes the butterfly operation on the data of frequency domain. Note that, herein, the data of frequency domain is the data of frequency domain acquired by the data input unit 43 from the selector 40. Each butterfly operation unit 44 of the plurality of layers 41 outputs data on which the butterfly operation is executed to the data input unit 43 of the next layer out of the plurality of layers 41 (note that, the butterfly operation unit 44 of a lowest layer outputs the data on which the butterfly operation is executed to the data output unit 42). For example, in the example in FIG. 4, when the butterfly operation unit 44 of the highest layer out of the plurality of layers 41 acquires the data of frequency domain from the data input unit 43 of the highest layer, this executes the butterfly operation on the data of frequency domain. The butterfly operation unit 44 of the highest layer outputs the data on which the butterfly operation is executed to the data input unit 43 of the next highest layer out of the plurality of layers 41.

When each butterfly operation unit 44 of the plurality of layers 41 acquires the data after the butterfly operation from the data input unit 43 of the same layer out of the plurality of layers 41, this executes the butterfly operation on the data after the butterfly operation. Each butterfly operation unit 44 of the plurality of layers 41 outputs data on which the butterfly operation is executed to the data input unit 43 of the next layer out of the plurality of layers 41 (note that, the butterfly operation unit 44 of a lowest layer outputs the data on which the butterfly operation is executed to the data output unit 42). For example, in the example in FIG. 4, when the butterfly operation unit 44 of the next highest layer out of the plurality of layers 41 acquires the data after the butterfly operation from the data input unit 43 of the next highest layer, this executes the butterfly operation on the data after the butterfly operation. Note that, the data after the butterfly operation is the data on which the butterfly operation unit 44 of the highest layer out of the plurality of layers 41 performs the butterfly operation. The butterfly operation unit 44 of the next highest layer outputs the data on which the butterfly operation is executed to the data input unit 43 of a next layer of the next highest layer (third highest layer) out of the plurality of layers 41.

Regarding the selection of the data input unit 43 based on the communication use of the communication frame by the selector 40, for example, the layer to which the data input unit 43 selected by the selector 40 belongs when the communication use specified by the communication use specifying unit 14 is the control use is the layer later than the layer to which the data input unit 43 selected by the selector 40 belongs when the communication use specified by the communication use specifying unit 14 is the information use. In other words, the layer to which the data input unit 43 selected by the selector 40 belongs when the communication use specified by the communication use specifying unit 14 is the control use is the layer in which the processing is performed after the layer to which the data input unit 43 selected by the selector 40 belongs when the communication use specified by the communication use specifying unit 14 is the information use. That is, the size of the butterfly operation executed by the butterfly operation unit 44 belonging to the same layer as the layer to which the data input unit 43 as the output destination selected by the selector 40 belongs when the communication use specified by the communication use specifying unit 14 is the control use is smaller than the size of the butterfly operation executed by the butterfly operation unit 44 belonging to the same layer as the layer to which the data input unit 43 as the output destination selected by the selector 40 belongs when the communication use specified by the communication use specifying unit 14 is the information use. For example, in the example in FIG. 4, when the communication use specified by the communication use specifying unit 14 is the control use, the selector 40 selects the data input unit 43 of the next highest layer out of the plurality of layers 41 (Input B in FIG. 4), and when the communication use specified by the communication use specifying unit 14 is the information use, the selector 40 selects the data input unit 43 of the highest layer out of the plurality of layers 41 (Input A in FIG. 4). The number of input bits of the butterfly operation executed by the butterfly operation unit 44 of the next highest layer is 8, which is smaller than 16, which is the number of input bits of the butterfly operation executed by the butterfly operation unit 44 of the highest layer.

In another example, for example, the layer to which the data input unit 43 selected by the selector 40 belongs when the communication use specified by the communication use specifying unit 14 is the control use to control a single device is the layer later than the layer to which the data input unit 43 selected by the selector 40 belongs when the communication use specified by the communication use specifying unit 14 is the control use to control each of the plurality of devices.

The data output unit 42 acquires the data after the butterfly operation from the butterfly operation unit 44 of the lowest layer out of the plurality of layers 41, and outputs the same to the DA converter 12 as the communication frame of time domain.

Figure 5:
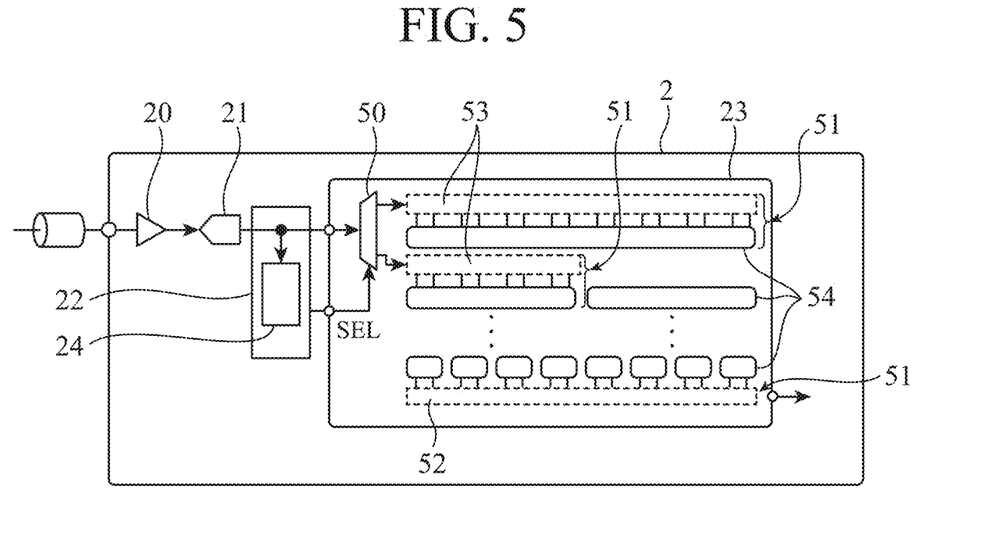
FIG. 5 is a block diagram illustrating a detailed configuration of the OFDM demodulation device according to the first embodiment.

Hereinafter, a detailed configuration of the OFDM demodulation device 2 according to the first embodiment will be described. FIG. 5 is a block diagram illustrating the detailed configuration of the OFDM demodulation device 2 according to the first embodiment. As illustrated in FIG. 1 or FIG. 5, the OFDM demodulation device 2 is provided with the amplifying element 20, the AD converter 21, the symbol synchronization unit 22, and the fast Fourier transform unit 23.

The amplifying element 20 amplifies the communication frame of time domain output by the OFDM modulation device 1. The amplifying element 20 outputs the amplified communication frame of time domain to the AD converter 21.

The AD converter 21 converts the communication frame of time domain amplified by the amplifying element 20 from analog data to digital data. The AD converter 21 outputs the communication frame of time domain converted to the digital data to the symbol synchronization unit 22.

The symbol synchronization unit 22 performs the symbol synchronization on the communication frame of time domain output from the AD converter 21. More specifically, for example, in an example in which the communication frame of time domain is the communication frame 30 illustrated in FIG. 3, the symbol synchronization unit 22 determines a reception timing of the communication frame 30 on the basis of the preamble 311 stored in the header symbol 31 of the communication frame 30.

The symbol synchronization unit 22 is provided with the communication use determining unit 24. The communication use determining unit 24 determines the communication use of the communication frame on the basis of the communication use specifying information stored in the header of the communication frame of time domain. The communication use determining unit 24 outputs a determination result to the fast Fourier transform unit 23. In further detail, in the first embodiment, the communication use determining unit 24 determines the communication use of the communication frame on the basis of the communication use specifying information stored in the header of the communication frame of time domain output by the AD converter 21. More specifically, for example, in an example in which the communication frame of time domain is the communication frame 30 illustrated in FIG. 3, the communication use determining unit 24 determines the communication use of the communication frame 30 on the basis of the communication use specifying information stored in the communication use bit area 313 of the header symbol 31 of the communication frame 30.

For example, when the communication use specifying information indicates that the use of the communication frame is the control use, the communication use determining unit 24 determines that the communication use of the communication frame is the control use. For example, when the communication use specifying information indicates that the use of the communication frame is the information use, the communication use determining unit 24 determines that the communication use of the communication frame is the information use.

The fast Fourier transform unit 23 generates the data of frequency domain by executing a fast Fourier transform of a size corresponding to the communication use determined by the communication use determining unit 24 on the communication frame of time domain. In further detail, in the first embodiment, the fast Fourier transform unit 23 generates the data of frequency domain by executing the fast Fourier transform of the size corresponding to the communication use determined by the communication use determining unit 24 on the communication frame of time domain on which the symbol synchronization is performed by the symbol synchronization unit 22. Note that, herein, the size is intended to mean the number of input bits (the number of samples) of the fast Fourier transform.

Regarding the size of the fast Fourier transform executed by the fast Fourier transform unit 23, for example, the size of the fast Fourier transform executed by the fast Fourier transform unit 23 when the communication use determining unit 24 determines that the communication use of the communication frame is the control use is smaller than the size of the fast Fourier transform executed by the fast Fourier transform unit 23 when the communication use determining unit 24 determines that the communication use of the communication frame is the information use.

In another example, for example, the size of the fast Fourier transform executed by the fast Fourier transform unit 23 when the communication use determining unit 24 determines that the communication use of the communication frame is the control use to control a single device is smaller than the size of the fast Fourier transform executed by the fast Fourier transform unit 23 when the communication use determining unit 24 determines that the communication use of the communication frame is the control use to control each of the plurality of devices.

Hereinafter, a detailed configuration of the fast Fourier transform unit 23 of the OFDM demodulation device 2 according to the first embodiment will be described. Note that, since the configuration of the fast Fourier transform unit 23 of the OFDM demodulation device 2 is similar to the configuration of the inverse fast Fourier transform unit 11 of the OFDM modulation device 1 illustrated in FIG. 4, the configuration of the inverse fast Fourier transform unit 11 of the OFDM modulation device 1 described with reference to FIG. 4 can be similarly applied to the configuration of the fast Fourier transform unit 23 of the OFDM demodulation device 2.

As illustrated in FIG. 5, the fast Fourier transform unit 23 is provided with a selector 50, a plurality of layers 51, and a data output unit 52. Each of the plurality of layers 51 includes at least one or more data input units 53 and at least one or more butterfly operation units 54 that execute a butterfly operation. More specifically, for example, a highest layer out of the plurality of layers 51 is provided with one data input unit 53 and one butterfly operation unit 54 that acquires data from the data input unit 53. A next highest layer out of the plurality of layers 51 is provided with two data input units 53, the butterfly operation unit 54 that acquires the data from one of the two data input units 53, and the butterfly operation unit 54 that acquires the data from the other of the two data input units 53.

The selector 50 selects the data input unit 53 as an output destination to which the communication frame of time domain is output out of the data input units 53 of the plurality of layers 51 on the basis of the communication use determined by the communication use determining unit 24. Note that, the data of time domain is the communication frame of time domain on which the symbol synchronization is performed by the symbol synchronization unit 22. The selector 50 outputs the communication frame of time domain to the selected data input unit 53.

The plurality of layers 51 executes the fast Fourier transform by executing the butterfly operation for each layer.

In further detail, when the data input unit 53 of the plurality of layers 51 acquires the communication frame of time domain from the selector 50, this outputs the communication frame of time domain to the butterfly operation unit 54 of the same layer out of the plurality of layers 51. More specifically, for example, when the data input unit 53 of the highest layer out of the plurality of layers 51 acquires the communication frame of time domain from the selector 50, this outputs the communication frame of time domain to the butterfly operation unit 54 of the highest layer.

When the data input unit 53 of the plurality of layers 51 acquires data after the butterfly operation from the butterfly operation unit 54 of a preceding layer out of the plurality of layers 51, this outputs the data after the butterfly operation to the butterfly operation unit 54 of the same layer out of the plurality of layers 51. More specifically, for example, when the data input unit 53 of the next highest layer out of the plurality of layers 51 acquires the data after the butterfly operation from the butterfly operation unit 54 of the highest layer out of the plurality of layers 51, this outputs the data after the butterfly operation to the butterfly operation unit 54 of the next highest layer out of the plurality of layers 51.

In each butterfly operation unit 54 of the plurality of layers 51, a size of the butterfly operation to be executed is smaller as the layer to which this belongs is a later layer. In other words, each butterfly operation unit 54 of the plurality of layers 51 executes the butterfly operation of a smaller size as the layer to which this belongs is a later layer. Note that, herein, the size is intended to mean the number of input bits of the butterfly operation. For example, the butterfly operation unit 54 of the highest layer out of the plurality of layers 51 executes the butterfly operation with the number of input bits of 16. In contrast, the butterfly operation unit 54 of the next highest layer out of the plurality of layers 51 executes the butterfly operation with the number of input bits of 8.

When each butterfly operation unit 54 of the plurality of layers 51 acquires the communication frame of time domain from the data input unit 53 of the same layer out of the plurality of layers 51, this executes the butterfly operation on the communication frame of time domain. Note that, herein, the communication frame of time domain is the communication frame of time domain acquired by the data input unit 53 from the selector 50. Each butterfly operation unit 54 of the plurality of layers 51 outputs data on which the butterfly operation is executed to the data input unit 53 of the next layer out of the plurality of layers 51 (note that, the butterfly operation unit 54 of a lowest layer outputs the data on which the butterfly operation is executed to the data output unit 52). For example, when the butterfly operation unit 54 of the highest layer out of the plurality of layers 51 acquires the communication frame of time domain from the data input unit 53 of the highest layer, this executes the butterfly operation on the communication frame of time domain. The butterfly operation unit 54 of the highest layer outputs the data on which the butterfly operation is executed to the data input unit 53 of the next highest layer out of the plurality of layers 51.

When each butterfly operation unit 54 of the plurality of layers 51 acquires the data after the butterfly operation from the data input unit 53 of the same layer out of the plurality of layers 51, this executes the butterfly operation on the data after the butterfly operation. Each butterfly operation unit 54 of the plurality of layers 51 outputs data on which the butterfly operation is executed to the data input unit 53 of the next layer out of the plurality of layers 51 (note that, the butterfly operation unit 54 of a lowest layer outputs the data on which the butterfly operation is executed to the data output unit 52). For example, when the butterfly operation unit 54 of the next highest layer out of the plurality of layers 51 acquires the data after the butterfly operation from the data input unit 53 of the next highest layer, this executes the butterfly operation on the data after the butterfly operation. Note that, the data after the butterfly operation is the data on which the butterfly operation unit 54 of the highest layer out of the plurality of layers 51 performs the butterfly operation. The butterfly operation unit 54 of the next highest layer outputs the data on which the butterfly operation is executed to the data input unit 53 of a next layer of the next highest layer out of the plurality of layers 51.

Regarding the selection of the data input unit 53 based on the communication use of the communication frame by the selector 50, for example, the layer to which the data input unit 53 selected by the selector 50 belongs when the communication use determining unit 24 determines that the communication use of the communication frame is the control use is the layer later than the layer to which the data input unit 53 selected by the selector 50 belongs when the communication use determining unit 24 determines that the communication use of the communication frame is the information use. In other words, the layer to which the data input unit 53 selected by the selector 50 belongs when the communication use determining unit 24 determines that the communication use of the communication frame is the control use is the layer in which the processing is performed after the layer to which the data input unit 53 selected by the selector 50 belongs when the communication use determining unit 24 determines that the communication use of the communication frame is the information use. That is, the size of the butterfly operation executed by the butterfly operation unit 54 belonging to the same layer as the layer to which the data input unit 53 as the output destination selected by the selector 50 belongs when the communication use determining unit 24 determines that the communication use of the communication frame is the control use is smaller than the size of the butterfly operation executed by the butterfly operation unit 54 belonging to the same layer as the layer to which the data input unit 53 as the output destination selected by the selector 50 belongs when the communication use determining unit 24 determines that the communication use of the communication frame is the information use. For example, when the communication use determining unit 24 determines that the communication use of the communication frame is the control use, the selector 50 selects the data input unit 53 of the next highest layer out of the plurality of layers 51 (corresponding to Input B in FIG. 4), and when the communication use determining unit 24 determines that the communication use of the communication frame is the information use, the selector 50 selects the data input unit 53 of the highest layer out of the plurality of layers 51 (corresponding to Input A in FIG. 4). The number of input bits of the butterfly operation executed by the butterfly operation unit 54 of the next highest layer is 8, which is smaller than 16, which is the number of input bits of the butterfly operation executed by the butterfly operation unit 54 of the highest layer.

In another example, for example, the layer to which the data input unit 53 selected by the selector 50 belongs when the communication use determining unit 24 determines that the communication use of the communication frame is the control use to control a single device is the layer later than the layer to which the data input unit 53 selected by the selector 50 belongs when the communication use determining unit 24 determines that the communication use of the communication frame is the control use to control each of the plurality of devices.

The data output unit 52 acquires the data after the butterfly operation from the butterfly operation unit 54 of the lowest layer out of the plurality of layers 51, and outputs the same as data of frequency domain. The data of frequency domain is used, for example, for device control, image display, audio output or the like.

Figure 6:
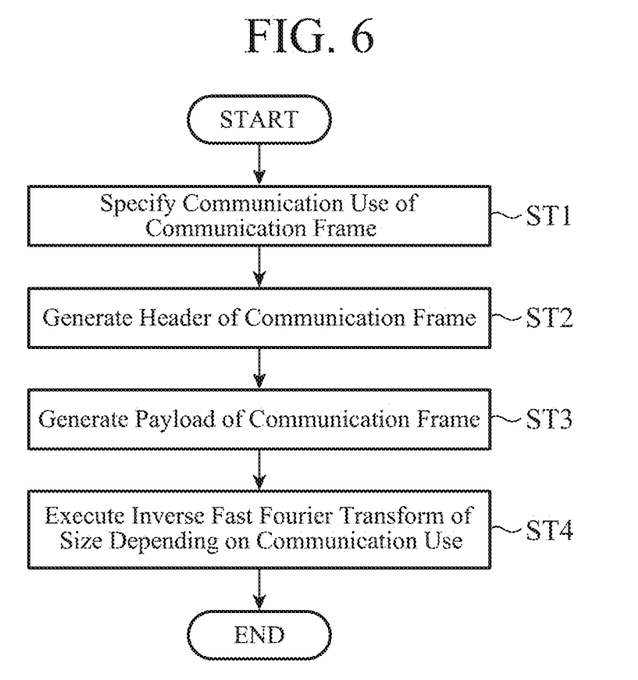
FIG. 6 is a flowchart illustrating an OFDM modulation method by the OFDM modulation device according to the first embodiment.

Hereinafter, an operation of the OFDM modulation device 1 according to the first embodiment will be described with reference to the drawings. FIG. 6 is a flowchart illustrating an OFDM modulation method by the OFDM modulation device 1 according to the first embodiment. Note that, a method in which the OFDM modulation method and an OFDM demodulation method to be described later are combined forms an OFDM communication method by the OFDM communication system 100 according to the first embodiment.

As illustrated in FIG. 6, the communication use specifying unit 14 specifies the communication use of the communication frame (step ST1). The communication use specifying unit 14 outputs information indicating the specified communication use to each of the header generating unit 15 and the inverse fast Fourier transform unit 11.

Next, the header generating unit 15 generates the header of the communication frame in which the communication use specifying information indicating the communication use specified by the communication use specifying unit 14 is stored (step ST2). The header generating unit 15 outputs the generated header to the inverse fast Fourier transform unit 11.

Next, the payload generating unit 16 generates the payload of the communication frame (step ST3). The payload generating unit 16 outputs the generated payload to the inverse fast Fourier transform unit 11.

Next, the inverse fast Fourier transform unit 11 generates the communication frame of time domain by executing the inverse fast Fourier transform of the size corresponding to the communication use specified by the communication use specifying unit 14 on the data of frequency domain including the header generated by the header generating unit 15 and the payload generated by the payload generating unit 16 (step ST4). The communication frame of time domain generated by the inverse fast Fourier transform unit 11 is transmitted to the OFDM demodulation device 2 after each processing of the DA converter 12 and the amplifying element 13 described above.

Figure 7:
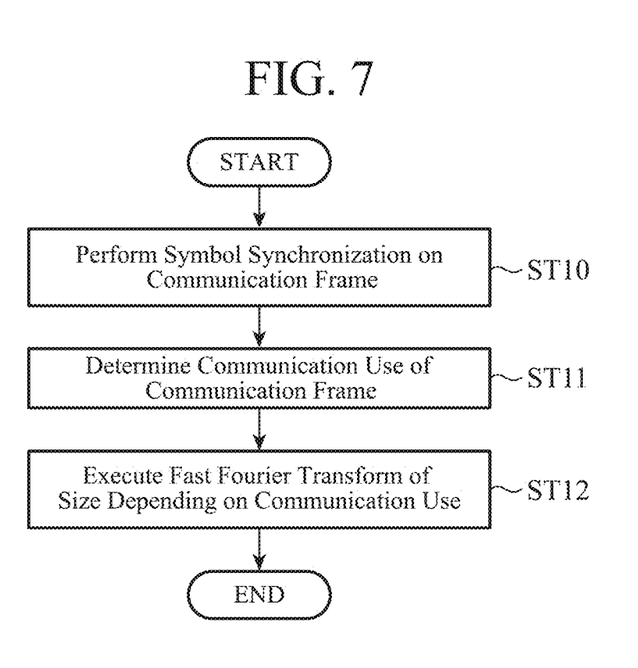
FIG. 7 is a flowchart illustrating an OFDM demodulation method by the OFDM demodulation device according to the first embodiment.

Hereinafter, an operation of the OFDM demodulation device 2 according to the first embodiment will be described with reference to the drawings. FIG. 7 is a flowchart illustrating the OFDM demodulation method by the OFDM demodulation device 2 according to the first embodiment. Note that, it is set that the communication frame of time domain transmitted from the OFDM modulation device 1 is subjected to each processing of the amplifying element 20 and the AD converter 21 described above before each step described below is executed.

As illustrated in FIG. 7, the symbol synchronization unit 22 performs the symbol synchronization on the communication frame of time domain output from the AD converter 21 (step ST10). The symbol synchronization unit 22 outputs the communication frame of time domain on which the symbol synchronization is performed to the fast Fourier transform unit 23.

More specifically, at step ST10, the symbol synchronization unit 22 determines a timing to start the fast Fourier transform executed by the inverse fast Fourier transform unit 11 at later steps. At that time, the symbol synchronization unit 22 detects a portion of the header in the communication frame of time domain.

Next, the communication use determining unit 24 determines the communication use of the communication frame on the basis of the communication use specifying information stored in the header of the communication frame of time domain (step ST11). The communication use determining unit 24 outputs a determination result to the fast Fourier transform unit 23.

Next, the fast Fourier transform unit 23 generates the data of frequency domain by executing the fast Fourier transform of the size corresponding to the communication use determined by the communication use determining unit 24 on the communication frame of time domain on which the symbol synchronization is performed by the symbol synchronization unit 22 (step ST12).

Figure 8:
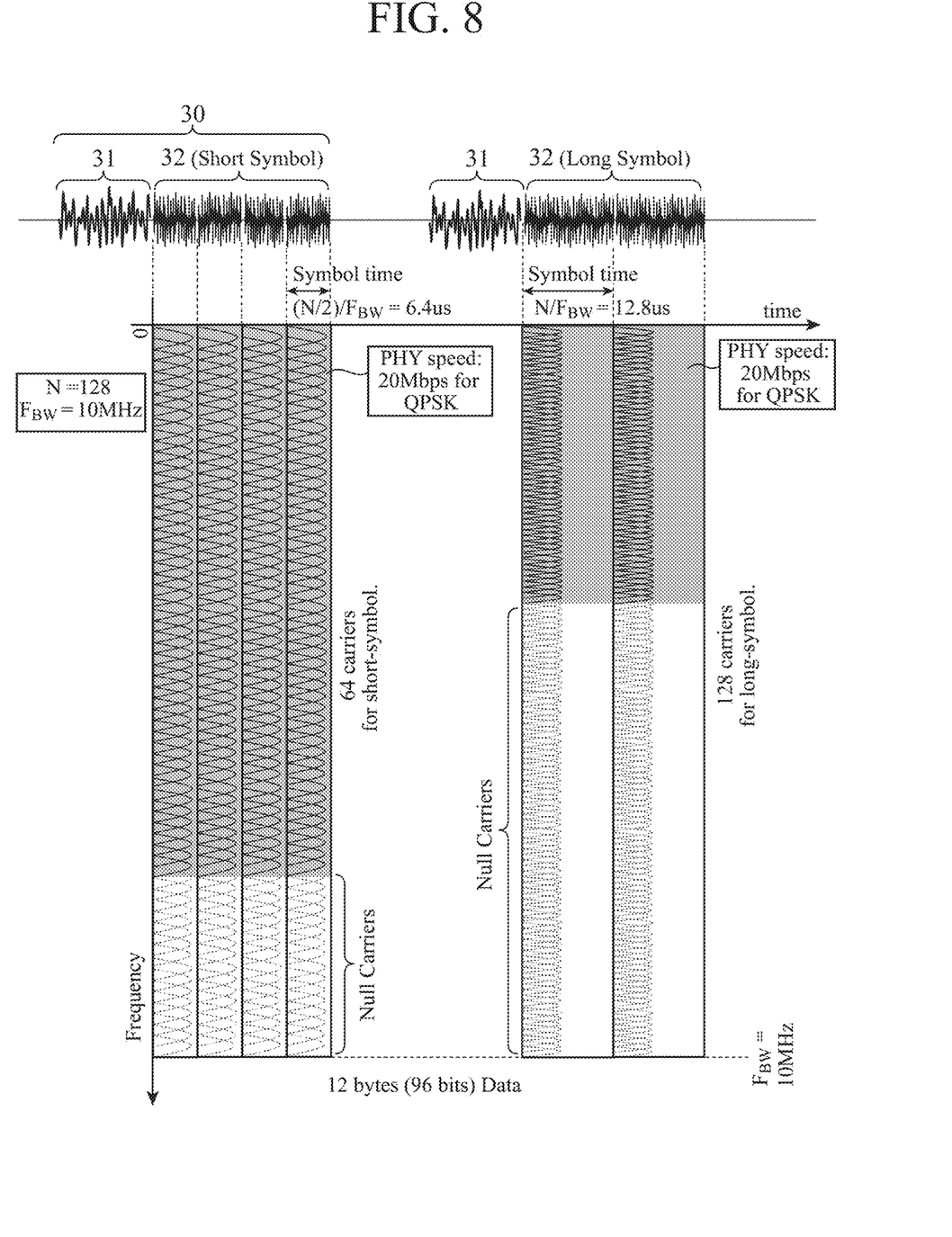
FIG. 8 is a diagram for illustrating a specific example of an OFDM communication method by an OFDM communication system 100 according to the first embodiment.

Hereinafter, a specific example of the OFDM communication method by the OFDM communication system 100 according to the first embodiment is described with reference to the drawings. FIG. 8 is a diagram for illustrating the specific example of the OFDM communication method by the OFDM communication system 100 according to the first embodiment. An upper left graph in FIG. 8 illustrates a waveform of the communication frame 30 of time domain transmitted from the OFDM modulation device 1 to the OFDM demodulation device 2 when the communication use of the communication frame 30 is the control use. In the upper left graph in FIG. 8, amplitude is plotted along the vertical axis, and time is plotted along the horizontal axis. As illustrated in the upper left graph in FIG. 8, the communication frame 30 includes the header symbol 31 and a plurality of payload symbols 32. A lower left graph in FIG. 8 is a graph illustrating a configuration of a subcarrier corresponding to each payload symbol 32 illustrated in the upper left graph in FIG. 8. In the lower left graph in FIG. 8, the frequency is plotted along the vertical axis. An upper right graph in FIG. 8 illustrates a waveform of the communication frame 30 of time domain transmitted from the OFDM modulation device 1 to the OFDM demodulation device 2 when the communication use of the communication frame 30 is the information use. In the upper right graph in FIG. 8, amplitude is plotted along the vertical axis, and time is plotted along the horizontal axis. As illustrated in the upper right graph in FIG. 8, the communication frame 30 includes the header symbol 31 and a plurality of payload symbols 32. A lower right graph in FIG. 8 is a graph illustrating a configuration of a subcarrier corresponding to each payload symbol 32 indicated by the upper right graph in FIG. 8. In the lower right graph in FIG. 8, the frequency is plotted along the vertical axis. Note that, the information amount of the communication frame 30 of the information use is actually larger than the information amount of the communication frame 30 of the control use, but in FIG. 8, for comparison, the information amount of the communication frame 30 of the control use is set to be the same as the information amount of the communication frame 30 of the information use. That is, the number of subcarriers used per symbol in the lower left graph in FIG. 8 is the same as the number of subcarriers used per symbol in the lower right graph in FIG. 8.

First, an example in which the communication use of the communication frame 30 is the control use (left diagram in FIG. 8) will be described. At step ST1 described above, the communication use specifying unit 14 specifies the control use as the communication use of the communication frame 30. Next, at step ST2 described above, the header generating unit 15 generates the header symbol 31 of the communication frame 30 in which the communication use specifying information indicating that the communication use of the communication frame 30 is the control use is stored. Next, at step ST3 described above, the payload generating unit 16 generates a plurality of payload symbols 32 of the communication frame 30. Note that, the plurality of payload symbols 32 is a control signal.

Next, at step ST4 described above, the inverse fast Fourier transform unit 11 generates the communication frame 30 of time domain by executing the inverse fast Fourier transform of a size corresponding to the control use for each symbol on the data of frequency domain including the header symbol 31 generated by the header generating unit 15 and a plurality of payload symbols 32 generated by the payload generating unit 16. The communication frame 30 of time domain is transmitted to the OFDM demodulation device 2 after each processing of the DA converter 12 and the amplifying element 13 described above. As illustrated in the left diagram in FIG. 8, it is set that the communication frame 30 of time domain includes 64 subcarriers for each symbol by the inverse fast Fourier transform of the size corresponding to the control use at step ST4 described above.

Next, at step ST10 described above, the symbol synchronization unit 22 performs the symbol synchronization on the communication frame 30 of time domain. Next, at step ST11 described above, the communication use determining unit 24 determines that the communication use of the communication frame 30 is the control use on the basis of the communication use specifying information stored in the header symbol 31 of the communication frame 30 of time domain. Next, at step ST12 described above, the fast Fourier transform unit 23 generates the data of frequency domain by executing the fast Fourier transform of the size corresponding to the control use on the communication frame 30 of time domain on which the symbol synchronization is performed by the symbol synchronization unit 22.

Hereinafter, an example in which the communication use of the communication frame 30 is the information use (right diagram in FIG. 8) will be described. At step ST1 described above, the communication use specifying unit 14 specifies the information use as the communication use of the communication frame 30. Next, at step ST2 described above, the header generating unit 15 generates the header symbol 31 of the communication frame 30 in which the communication use specifying information indicating that the communication use of the communication frame 30 is the information use is stored. Next, at step ST3 described above, the payload generating unit 16 generates a plurality of payload symbols 32 of the communication frame 30. Note that, the plurality of payload symbols 32 is data having a larger information amount than that of the control signal.

Next, at step ST4 described above, the inverse fast Fourier transform unit 11 generates the communication frame 30 of time domain by executing the inverse fast Fourier transform of a size corresponding to the information use for each symbol on the data of frequency domain including the header symbol 31 generated by the header generating unit 15 and a plurality of payload symbols 32 generated by the payload generating unit 16. The communication frame 30 of time domain is transmitted to the OFDM demodulation device 2 after each processing of the DA converter 12 and the amplifying element 13 described above. As illustrated in the right diagram in FIG. 8, it is set that the communication frame 30 of time domain includes 128 subcarriers for each symbol by the inverse fast Fourier transform of the size corresponding to the information use at step ST4 described above. That is, in this specific example, the size of the inverse fast Fourier transform executed by the inverse fast Fourier transform unit 11 when the communication use specified by the communication use specifying unit 14 is the control use is smaller than the size of inverse fast Fourier transform executed by the inverse fast Fourier transform unit 11 when the communication use specified by the communication use specifying unit 14 is the information use. Therefore, the number of subcarriers (64) for each symbol of the communication frame 30 when the communication use of the communication frame 30 is the control use is smaller than the number of subcarriers (128) for each symbol of the communication frame 30 when the communication use of the communication frame 30 is the information use.

Next, at step ST10 described above, the symbol synchronization unit 22 performs the symbol synchronization on the communication frame 30 of time domain. Next, at step ST11 described above, the communication use determining unit 24 determines that the communication use of the communication frame 30 is the information use on the basis of the communication use specifying information stored in the header symbol 31 of the communication frame 30 of time domain. Next, at step ST12 described above, the fast Fourier transform unit 23 generates the data of frequency domain by executing the fast Fourier transform of the size corresponding to the information use on the communication frame 30 of time domain on which the symbol synchronization is performed by the symbol synchronization unit 22.

As described above, according to the OFDM communication method according to this specific example, when the communication use of the communication frame 30 is the control use, the number of subcarriers of the communication frame 30 is 64, and when the communication use of the communication frame 30 is the information use, the number of subcarriers of the communication frame 30 is 128. As illustrated in the upper left graph in FIG. 8, the payload symbol 32 as a time waveform in the communication frame 30 is a short symbol by the inverse fast Fourier transform of the size corresponding to the control use. As illustrated in the upper right graph in FIG. 8, the payload symbol 32 as a time waveform in the communication frame 30 is a long symbol by the inverse fast Fourier transform of the size corresponding to the information use.

As illustrated in FIG. 8, when it is assumed that a frequency band $F_{BW}$ of the communication frame 30 is 0~10 MHz, a symbol time (symbol length) of the communication frame 30 when the communication use of the communication frame 30 is the control use is calculated by $(N/2)/F_{BW}$ (N is the number of input bits when the communication use of the communication frame 30 is the information use, and is set to 128) to be 6.4 μs, and the symbol time of the communication frame 30 when the communication use of the communication frame 30 is the information use is calculated by $N/F_{BW}$ to be 12.8 μs. When it is further assumed that multi-leveling of QPSK (two bits) is applied to each subcarrier of the communication frame 30, a maximum speed (theoretical value) of a physical layer is estimated to be 20 Mbps regardless of whether the communication use of the communication frame 30 is the control use or the information use.

That is, even when the number of subcarriers is halved to 64 (that is, the size of the inverse fast Fourier transform and the size of the fast Fourier transform are halved) for small-capacity data transmission of the control use, the maximum speed (theoretical value) of the physical layer remains 20 Mbps. In further detail, in this specific example, although the number of bits carried per symbol is halved, the time (symbol time) required per symbol is also halved from 12.8 μs to 6.4 μs, so that an effective physical speed remains 20 Mbps. In other words, the physical speed depends on the frequency band (10 MHz) of the communication frame 30 and a multi-level degree of a digital modulation system (multi-level degree of QPSK (two bits)).

In the configuration of the communication frame 30 illustrated in FIG. 8 as described above, as an example of communication of the control use, it is assumed that the OFDM modulation device 1 transmits small-capacity data of 12 bytes (96 bits) to the OFDM demodulation device 2. In that case, 48 subcarriers are used for 12-byte data. In a configuration in which the number of subcarriers per symbol in the communication frame 30 is 128 as the number of subcarriers of the communication frame 30 when the communication use of the communication frame 30 is the information use, remaining 80 subcarriers are unused and are uneconomical. In contrast, in a configuration in which the number of subcarriers per symbol in the communication frame 30 is 64 as the number of communication frames when the communication use of the communication frame 30 is the control use, only remaining 16 subcarriers are unused. That is, it is possible to reduce the unused subcarriers by changing the size of the inverse fast Fourier transform by the inverse fast Fourier transform unit 11 of the OFDM modulation device 1 and the size of the fast Fourier transform by the fast Fourier transform unit 23 of the OFDM demodulation device 2 to half corresponding to the communication use of the communication frame 30 and performing the communication while setting the number of subcarriers of the communication frame 30 to 64. As a result, even when the communication of small-capacity data (for example, of around 10 bytes) for the control use is performed, suitable communication can be implemented without deteriorating transmission efficiency. The communication of the control use in industrial equipment is often required to have real-time performance or low-delay performance, and the OFDM communication method capable of shortening the symbol time when the communication use of the communication frame 30 is the control use as in this specific example is conceivable to be a method that meets such a requirement of the industrial equipment.

A processing circuit implements each function of the communication frame generating unit 10 (the communication use specifying unit 14, the header generating unit 15, and the payload generating unit 16) and the inverse fast Fourier transform unit 11 (the selector 40, the data input unit 43, the butterfly operation unit 44, and the data output unit 42) in the OFDM modulation device 1. That is, the communication frame generating unit 10 and the inverse fast Fourier transform unit 11 of the OFDM modulation device 1 are provided with the processing circuit for executing processing at each step illustrated in FIG. 6. The processing circuit may be dedicated hardware, but may be a central processing unit (CPU) that executes a program stored in a memory.

A processing circuit implements each function of the symbol synchronization unit 22 (the communication use determining unit 24), and the fast Fourier transform unit 23 (the selector 50, the data input unit 53, the butterfly operation unit 54, and the data output unit 52) in the OFDM demodulation device 2. That is, the symbol synchronization unit 22 and the fast Fourier transform unit 23 of the OFDM demodulation device 2 are provided with the processing circuit for executing processing at each step illustrated in FIG. 7. The processing circuit may be dedicated hardware, but may be a central processing unit (CPU) that executes a program stored in a memory.

Figure 9A:
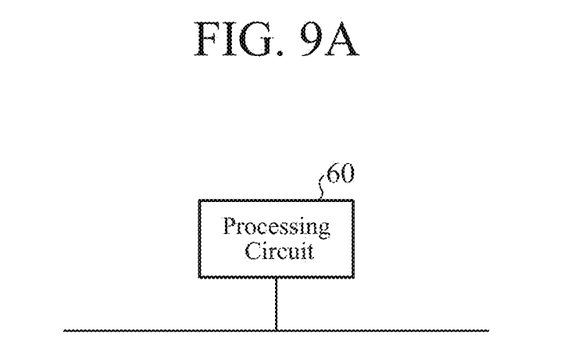
FIG. 9A is a block diagram illustrating a hardware configuration that implements each function of a communication frame generating unit and an inverse fast Fourier transform unit of the OFDM modulation device according to the first embodiment or each function of a symbol synchronization unit and a fast Fourier transform unit of the OFDM demodulation device according to the first embodiment.
Figure 9B:
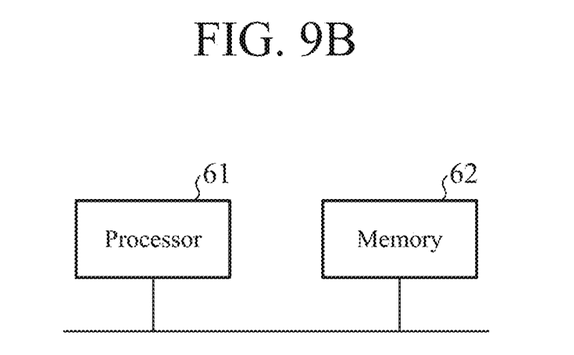
FIG. 9B is a block diagram illustrating a hardware configuration that executes software that implements each function of the communication frame generating unit and the inverse fast Fourier transform unit of the OFDM modulation device according to the first embodiment or a hardware configuration that executes software that implements each function of the symbol synchronization unit and the fast Fourier transform unit of the OFDM demodulation device according to the first embodiment.

FIG. 9A is a block diagram illustrating a hardware configuration that implements each function of the communication frame generating unit 10 and the inverse fast Fourier transform unit 11 of the OFDM modulation device 1 or each function of the symbol synchronization unit 22 and the fast Fourier transform unit 23 of the OFDM demodulation device 2. FIG. 9B is a block diagram illustrating a hardware configuration that executes software that implements each function of the communication frame generating unit 10 and the inverse fast Fourier transform unit 11 of the OFDM modulation device 1 or a hardware configuration that executes software that implements each function of the symbol synchronization unit 22 and the fast Fourier transform unit 23 of the OFDM demodulation device 2.

When the processing circuit described above is a processing circuit 60 of the dedicated hardware illustrated in FIG. 9A, the processing circuit 60 corresponds to, for example, a single circuit, a composite circuit, a programmed processor, a parallel-programmed processor, an application specific integrated circuit (ASIC), a field-programmable gate array (FPGA), or a combination of them.

Each function of the communication frame generating unit 10 and the inverse fast Fourier transform unit 11 of the OFDM modulation device 1 may be implemented by separate processing circuits, or these functions may be collectively implemented by one processing circuit. Each function of the symbol synchronization unit 22 and the fast Fourier transform unit 23 of the OFDM demodulation device 2 may be implemented by separate processing circuits, or these functions may be collectively implemented by one processing circuit.

When the processing circuit described above is a processor 61 illustrated in FIG. 9B, each function of the communication frame generating unit 10 and the inverse fast Fourier transform unit 11 of the OFDM modulation device 1 is implemented by software, firmware, or a combination of the software and firmware. Each function of the symbol synchronization unit 22 and the fast Fourier transform unit 23 of the OFDM demodulation device 2 is implemented by software, firmware, or a combination of the software and firmware.

Note that, the software or firmware is described as a program and stored in a memory 62.

The processor 61 implements each function of the communication frame generating unit 10 and the inverse fast Fourier transform unit 11 of the OFDM modulation device 1 by reading and executing the program stored in the memory 62. That is, the communication frame generating unit 10 and the inverse fast Fourier transform unit 11 of the OFDM modulation device 1 are provided with the memory 62 for storing the program by which processing at each step illustrated in FIG. 6 is executed as a result when each of the functions is executed by the processor 61.

The processor 61 implements each function of the symbol synchronization unit 22 and the fast Fourier transform unit 23 of the OFDM demodulation device 2 by reading and executing the program stored in the memory 62. That is, the symbol synchronization unit 22 and the fast Fourier transform unit 23 of the OFDM demodulation device 2 are provided with the memory 62 for storing the program by which processing at each step illustrated in FIG. 7 is executed as a result when each of the functions is executed by the processor 61.

These programs allow a computer to execute procedures or methods performed by the communication frame generating unit 10 and the inverse fast Fourier transform unit 11 of the OFDM modulation device 1. The memory 62 may be a computer-readable storage medium storing a program for allowing a computer to serve as the communication frame generating unit 10 and the inverse fast Fourier transform unit 11 of the OFDM modulation device 1.

These programs allow a computer to execute procedures or methods performed by the symbol synchronization unit 22 and the fast Fourier transform unit 23 of the OFDM demodulation device 2. The memory 62 may be a computer-readable storage medium storing a program for allowing a computer to serve as the symbol synchronization unit 22 and the fast Fourier transform unit 23 of the OFDM demodulation device 2.

The processor 61 corresponds to a central processing unit (CPU), a processing unit, an arithmetic device, a processor, a microprocessor, a microcomputer, a digital signal processor (DSP) or the like, for example.

The memory 62 corresponds to, for example, a nonvolatile or volatile semiconductor memory such as a random access memory (RAM), a read only memory (ROM), a flash memory, an erasable programmable read only memory (EPROM), and an electrically-EPROM (EEPROM); magnetic disk such as a hard disk and a flexible disk, a flexible disk, an optical disk, a compact disc, a mini disc, a compact disc (CD), a digital versatile disc (DVD) and the like.

A part of each function of the communication frame generating unit 10 and the inverse fast Fourier transform unit 11 of the OFDM modulation device 1 may be implemented by the dedicated hardware, and a part thereof may be implemented by the software or firmware. A part of each function of the symbol synchronization unit 22 and the fast Fourier transform unit 23 of the OFDM demodulation device 2 may be implemented by the dedicated hardware and a part thereof may be implemented by the software or firmware.

For example, the function of the communication frame generating unit 10 is implemented by a processing circuit as dedicated hardware. As for the inverse fast Fourier transform unit 11, the processor 61 may implement the function by reading and executing the program stored in the memory 62.

For example, the function of the symbol synchronization unit 22 is implemented by a processing circuit as dedicated hardware. As for the fast Fourier transform unit 23, the processor 61 may implement the function by reading and executing the program stored in the memory 62.

In this manner, the processing circuit can implement each of the functions described above by the hardware, software, firmware, or combination thereof.

As described above, the OFDM modulation device 1 according to the first embodiment is provided with the communication use specifying unit 14 to specify the communication use of the communication frame, the header generating unit 15 to generate the header of the communication frame in which the communication use specifying information indicating the communication use specified by the communication use specifying unit 14 is stored, the payload generating unit 16 to generate the payload of the communication frame, and the inverse fast Fourier transform unit 11 to generate the communication frame of time domain by executing the inverse fast Fourier transform of the size corresponding to the communication use specified by the communication use specifying unit 14 on the data of frequency domain including the header generated by the header generating unit 15 and the payload generated by the payload generating unit 16.

According to the configuration described above, it is possible to change the number of subcarriers for each symbol of the communication frame by changing the size of the inverse fast Fourier transform corresponding to the communication use of the communication frame. That is, the number of subcarriers can be changed when the communication use is changed.

Conventionally, in general, communication adopting an OFDM modulation and demodulation system is frequently used not only for wireless communication but also for wired communication (metal line communication) in which multipoint connection, branching or the like is present. In the OFDM communication system, for example, since an adaptive modulation type communication system is adopted, even under an environment where reflection occurs due to multipoint connection, modulation and demodulation conditions corresponding to transmission path characteristics are autonomously set, so that excellent communication can be performed.

The OFDM communication system might be utilized not only for communication of IoT (information) use in which megabyte class large-capacity data transmission is required, but also for communication of control use for industrial equipment in which small-capacity of around 10 bytes and real-time performance (low-delay) are required. That is, it is expected that the OFDM communication device can cope with different system requirements such as information use or control use.

Conventionally, an OFDM communication device can transmit a large amount of data by arranging a large number of subcarriers in one symbol (unit of modulation and demodulation processing) and performing multi-leveling such as BPSK, QPSK, or QAM modulation on each subcarrier. For example, assuming that 128 subcarriers are arranged in one symbol and QPSK modulation is applied to each subcarrier, the OFDM communication device can transmit up to 256 bits of information per symbol. A time required for one symbol (that is, one symbol length) corresponds to the reciprocal of a subcarrier frequency interval. For example, assuming that 128 subcarriers are arranged in a band of 10 MHz, one symbol length is 12.8 μs. Since 256 bits can be transmitted with this one symbol length, the maximum physical speed in this case can be estimated to be 20 Mbps.

When the conventional OFDM communication device as described above is used for information use, it is possible to perform large-capacity data communication as described above. In contrast, for example, when the OFDM communication device is to be used for control use of industrial equipment, a following problem of deterioration in transmission efficiency occurs. That is, in the control use of industrial equipment, a situation in which small-capacity data transmission of 12 bytes (96 bits) and the like, for example, is performed in one communication frequently occurs. In this case, in a system in which 256 bits (QPSK modulation) of information can be transmitted in one symbol, remaining 160 bits are transmitted in an unused subcarrier state, and uneconomical occurs.

However, according to the configuration described above of the OFDM modulation device 1 according to the first embodiment, it is possible to reduce the unused subcarriers by appropriately changing the size of the inverse fast Fourier transform corresponding to the communication use of the communication frame. As a result, for example, even when the communication of the control use of small capacity of about 10 bytes is performed, efficient communication can be performed without deteriorating a substantial transmission speed due to the reason described above. For example, communication that satisfies different system requirements such as large-capacity communication of information use for IoT or small-capacity communication of control use for industrial equipment can be implemented.

The communication use specified by the communication use specifying unit 14 in the OFDM modulation device 1 according to the first embodiment is the control use or the information use, and the size of the inverse fast Fourier transform executed by the inverse fast Fourier transform unit 11 when the communication use specified by the communication use specifying unit 14 is the control use is smaller than the size of the inverse fast Fourier transform executed by the inverse fast Fourier transform unit 11 when the communication use specified by the communication use specifying unit 14 is the information use.

According to the configuration described above, when the communication use of the communication frame is the control use, the inverse fast Fourier transform of the size smaller than the size of the inverse fast Fourier transform executed when the communication use of the communication frame is the information use is executed. As a result, when the communication use of the communication frame is the control use, the number of subcarriers for each symbol of the communication frame can be reduced. Therefore, when the communication use of the communication frame is the control use, unused subcarriers can be reduced.

The inverse fast Fourier transform unit 11 in the OFDM modulation device 1 according to the first embodiment includes the selector 40, and a plurality of layers to execute the inverse fast Fourier transform by executing the butterfly operation for each of the layers, the plurality of layers 41 each of which includes at least one or more data input units 43 and at least one or more butterfly operation units 44 to execute the butterfly operation, the selector 40 selects the data input unit 43 as the output destination to which the data of frequency domain is output out of the data input units 43 of the plurality of layers 41 on the basis of the communication use specified by the communication use specifying unit 14, and each of the data input units 43 of the plurality of layers 41 outputs, when acquiring the data of frequency domain from the selector 40, the data of frequency domain to the butterfly operation unit 44 of the same layer out of the plurality of layers 41, and outputs, when acquiring data after the butterfly operation from the butterfly operation unit 44 of a preceding layer out of the plurality of layers 41, the data after the butterfly operation to the butterfly operation unit 44 of the same layer out of the plurality of layers 41, and each of the butterfly operation units 44 of the plurality of layers 41 has a smaller size of the butterfly operation to be executed as a layer to which the butterfly operation unit belongs is a later layer, executes, when acquiring the data of frequency domain from the data input unit 43 of the same layer out of the plurality of layers 41, the butterfly operation on the data of frequency domain, and executes, when acquiring the data after the butterfly operation from the data input unit 43 of the same layer out of the plurality of layers 41, the butterfly operation on the data after the butterfly operation.

According to the configuration described above, the layer as the output destination to which the data of frequency domain is output is selected corresponding to the communication use of the communication frame. That is, as a result, the size of the inverse fast Fourier transform can be changed corresponding to the communication use of the communication frame. As a result, the number of subcarriers for each symbol of the communication frame can be changed. That is, the number of subcarriers can be changed when the communication use is changed.

The communication use specified by the communication use specifying unit 14 in the OFDM modulation device 1 according to the first embodiment is the control use or the information use, and the layer to which the data input unit 43 selected by the selector 40 belongs when the communication use specified by the communication use specifying unit 14 is the control use is the layer later than the layer to which the data input unit 43 selected by the selector 40 belongs when the communication use specified by the communication use specifying unit 14 is the information use.

According to the configuration described above, when the communication use of the communication frame is the control use, the layer later than the layer selected when the communication use of the communication frame is the information use is selected. That is, as a result, when the communication use of the communication frame is the control use, the inverse fast Fourier transform of the size smaller than the size of the inverse fast Fourier transform executed when the communication use of the communication frame is the information use can be executed. As a result, when the communication use of the communication frame is the control use, the number of subcarriers for each symbol of the communication frame can be reduced. Therefore, when the communication use of the communication frame is the control use, unused subcarriers can be reduced.

The OFDM demodulation device 2 according to the first embodiment is provided with the communication use determining unit 24 to determine, on the basis of the communication use specifying information stored in the header of the communication frame of time domain, the communication use of the communication frame, and the fast Fourier transform unit 23 to generate the data of frequency domain by executing the fast Fourier transform of the size corresponding to the communication use determined by the communication use determining unit 24 on the communication frame of time domain.

According to the configuration described above, it is possible to change the number of subcarriers for each symbol of the communication frame by changing the size of the fast Fourier transform corresponding to the communication use of the communication frame. That is, the number of subcarriers can be changed when the communication use is changed.

The communication use determining unit 24 in the OFDM demodulation device 2 according to the first embodiment determines that the communication use of the communication frame is the control use or determines that the communication use of the communication frame is the information use, and the size of the fast Fourier transform executed by the fast Fourier transform unit 23 when the communication use determining unit 24 determines that the communication use of the communication frame is the control use is smaller than the size of the fast Fourier transform executed by the fast Fourier transform unit 23 when the communication use determining unit 24 determines that the communication use of the communication frame is the information use.

According to the configuration described above, when the communication use of the communication frame is the control use, the fast Fourier transform of the size smaller than the size of the fast Fourier transform executed when the communication use of the communication frame is the information use is executed. As a result, when the communication use of the communication frame is the control use, the number of subcarriers for each symbol of the communication frame can be reduced. Therefore, when the communication use of the communication frame is the control use, unused subcarriers can be reduced.

The fast Fourier transform unit 23 in the OFDM demodulation device 2 according to the first embodiment includes the selector 50, and a plurality of layers to execute the fast Fourier transform by executing the butterfly operation for each of the layers, the plurality of layers each of which includes at least one or more data input units 53 and at least one or more butterfly operation units 54 to execute the butterfly operation, the selector 50 selects the data input unit 53 as the output destination to which the communication frame of time domain is output out of the data input units 53 of the plurality of layers 51 on the basis of the communication use determined by the communication use determining unit 24, and each of the data input units 53 of the plurality of layers 51 outputs, when acquiring the communication frame of time domain from the selector 50, the communication frame of time domain to the butterfly operation unit 54 of the same layer out of the plurality of layers, and outputs, when acquiring data after the butterfly operation from the butterfly operation unit 54 of a preceding layer out of the plurality of layers 51, the data after the butterfly operation to the butterfly operation unit 54 of the same layer out of the plurality of layers 51, and each of the butterfly operation units 54 of the plurality of layers 51 has a smaller size of the butterfly operation to be executed as the layer to which the butterfly operation unit belongs is a later layer, executes, when acquiring the communication frame of time domain from the data input unit 53 of the same layer out of the plurality of layers 51, the butterfly operation on the communication frame of time domain, and executes, when acquiring the data after the butterfly operation from the data input unit 53 of the same layer out of the plurality of layers 51, the butterfly operation on the data after the butterfly operation.

According to the configuration described above, the layer as the output destination to which the communication frame of time domain is output is selected corresponding to the communication use of the communication frame. That is, as a result, the size of the fast Fourier transform can be changed corresponding to the communication use of the communication frame. As a result, the number of subcarriers for each symbol of the communication frame can be changed. That is, the number of subcarriers can be changed when the communication use is changed.

The communication use determining unit 24 in the OFDM demodulation device 2 according to the first embodiment determines that the communication use of the communication frame is the control use or determines that the communication use of the communication frame is the information use, and the layer to which the data input unit 53 selected by the selector 50 belongs when the communication use determining unit 24 determines that the communication use of the communication frame is the control use is the layer later than the layer to which the data input unit 53 selected by the selector 50 belongs when the communication use determining unit 24 determines that the communication use of the communication frame is the information use.

According to the configuration described above, when the communication use of the communication frame is the control use, the layer later than the layer selected when the communication use of the communication frame is the control use is selected. That is, as a result, when the communication use of the communication frame is the control use, the fast Fourier transform of the size smaller than the size of the fast Fourier transform executed when the communication use of the communication frame is the information use can be executed. As a result, when the communication use of the communication frame is the control use, the number of subcarriers for each symbol of the communication frame can be reduced. Therefore, when the communication use of the communication frame is the control use, unused subcarriers can be reduced.

The OFDM communication system 100 according to the first embodiment is provided with the OFDM modulation device 1 according to the first embodiment and the OFDM demodulation device 2 according to the first embodiment.

According to the configuration described above, each of the effects described above obtained by the OFDM modulation device 1 according to the first embodiment and the OFDM demodulation device 2 according to the first embodiment can be implemented in the OFDM communication system 100.

The OFDM communication method according to the first embodiment is the OFDM communication method including the OFDM modulation method and the OFDM demodulation method, in which the OFDM modulation method includes a communication use specifying step of specifying a communication use of a communication frame, a header generating step of generating a header of the communication frame in which communication use specifying information indicating the communication use specified at the communication use specifying step is stored, a payload generating step of generating a payload of the communication frame, and an inverse fast Fourier transform step of generating a communication frame of time domain by executing an inverse fast Fourier transform of a size corresponding to the communication use specified at the communication use specifying step on data of frequency domain including the header generated at the header generating step and the payload generated at the payload generating step, and the OFDM demodulation method includes a communication use determining step of determining, on the basis of communication use specifying information stored in a header of the communication frame of time domain, a communication use of the communication frame, and a fast Fourier transform step of generating data of frequency domain by executing a fast Fourier transform of a size corresponding to the communication use determined at the communication use determining step on the communication frame of time domain.

According to the configuration described above, it is possible to obtain an effect similar to the effect described above obtained by the OFDM communication system 100 according to the first embodiment.

Note that, any component of the embodiment may be modified, or any component of the embodiment may be omitted.

INDUSTRIAL APPLICABILITY

The OFDM modulation device according to the present disclosure can change the number of subcarriers when the communication use is changed, so that this is applicable in the technology using the OFDM communication.

REFERENCE SIGNS LIST

1: OFDM modulation device, 2: OFDM demodulation device, 3: cable, 10: communication frame generating unit, 11: inverse fast Fourier transform unit, 12: DA converter, 13: amplifying element, 14: communication use specifying unit, 15: header generating unit, 16: payload generating unit, 20: amplifying element, 21: AD converter, 22: symbol synchronization unit, 23: fast Fourier transform unit, 24: communication use determining unit, 30: communication frame, 31: header symbol, 32: payload symbol, 40: selector, 41: layer, 42: data output unit, 43: data input unit, 44: butterfly operation unit, 50: selector, 51: layer, 52: data output unit, 53: data input unit, 54: butterfly operation unit, 60: processing circuit, 61: processor, 62: memory, 100: OFDM communication system

The invention claimed is:

1. An OFDM modulation device comprising:
a communication use specifier to specify a communication use of a communication frame;
a header generator to generate a header of the communication frame in which communication use specifying information indicating the communication use specified by the communication use specifier is stored;
a payload generator to generate a payload of the communication frame; and
an inverse fast Fourier transformer to generate a communication frame of time domain by executing an inverse fast Fourier transform of a size corresponding to the communication use specified by the communication use specifier on data of frequency domain including the header generated by the header generator and the payload generated by the payload generator,
wherein
the communication use specified by the communication use specifier is a control use or an information use, and
the size of the inverse fast Fourier transform executed by the inverse fast Fourier transformer when the communication use specified by the communication use specifier is the control use is smaller than the size of the inverse fast Fourier transform executed by the inverse fast Fourier transformer when the communication use specified by the communication use specifier is the information use.

2. An OFDM modulation device comprising:
a communication use specifier to specify a communication use of a communication frame;
a header generator to generate a header of the communication frame in which communication use specifying information indicating the communication use specified by the communication use specifier is stored;
a payload generator to generate a payload of the communication frame; and
an inverse fast Fourier transformer to generate a communication frame of time domain by executing an inverse fast Fourier transform of a size corresponding to the communication use specified by the communication use specifier on data of frequency domain including the header generated by the header generator and the payload generated by the payload generator,
wherein
the inverse fast Fourier transformer includes:
a selector; and
a plurality of layers to execute the inverse fast Fourier transform by executing a butterfly operation for each of the layers, the plurality of layers each of which includes at least one or more data inputters and at least one or more butterfly operators to execute the butterfly operation, the selector selects a data inputter as an output destination to which the data of frequency domain is output out of the data inputters of the plurality of layers on a basis of the communication use specified by the communication use specifier, and each of the data inputters of the plurality of layers outputs, when acquiring the data of frequency domain from the selector, the data of frequency domain to the butterfly operator of the same layer out of the plurality of layers, and outputs, when acquiring data after the butterfly operation from the butterfly operator of a preceding layer out of the plurality of layers, the data after the butterfly operation to the butterfly operator of the same layer out of the plurality of layers, and each of the butterfly operators of the plurality of layers has a smaller size of the butterfly operation to be executed as a layer to which the butterfly operator belongs is a later layer, executes, when acquiring the data of frequency domain from the data inputter of the same layer out of the plurality of layers, the butterfly operation on the data of frequency domain, and executes, when acquiring the data after the butterfly operation from the data inputter of the same layer out of the plurality of layers, the butterfly operation on the data after the butterfly operation, wherein the communication use specified by the communication use specifier is a control use or an information use, and a layer to which the data inputter selected by the selector belongs when the communication use specified by the communication use specifier is the control use is a layer later than a layer to which the data inputter selected by the selector belongs when the communication use specified by the communication use specifier is the information use.

3. An OFDM demodulation device comprising:

a communication use determiner to determine, on a basis of communication use specifying information stored in a header of a communication frame of time domain, a communication use of the communication frame; and a fast Fourier transformer to generate data of frequency domain by executing a fast Fourier transform of a size corresponding to the communication use determined by the communication use determiner on the communication frame of time domain, wherein the communication use determiner determines that the communication use of the communication frame is the control use or determines that the communication use of the communication frame is the information use, and the size of the fast Fourier transform executed by the fast Fourier transformer when the communication use determiner determines that the communication use of the communication frame is the control use is smaller than the size of the fast Fourier transform executed by the fast Fourier transformer when the communication use determiner determines that the communication use of the communication frame is the information use.

4. An OFDM demodulation device comprising:

a communication use determiner to determine, on a basis of communication use specifying information stored in a header of a communication frame of time domain, a communication use of the communication frame; and a fast Fourier transformer to generate data of frequency domain by executing a fast Fourier transform of a size corresponding to the communication use determined by the communication use determiner on the communication frame of time domain, wherein the fast Fourier transformer includes:

a selector; and a plurality of layers to execute a fast Fourier transform by executing a butterfly operation for each of the layers, the plurality of layers each of which includes at least one or more data inputters and at least one or more butterfly operators to execute the butterfly operation, the selector selects a data inputter as an output destination to which the communication frame of time domain is output out of the data inputters of the plurality of layers on a basis of the communication use determined by the communication use determiner, and each of the data inputters of the plurality of layers outputs, when acquiring the communication frame of time domain from the selector, the communication frame of time domain to the butterfly operator of the same layer out of the plurality of layers, and outputs, when acquiring data after the butterfly operation from the butterfly operator of a preceding layer out of the plurality of layers, the data after the butterfly operation to the butterfly operator of the same layer out of the plurality of layers, and each of the butterfly operators of the plurality of layers has a smaller size of the butterfly operation to be executed as the layer to which the butterfly operator belongs is a later layer, executes, when acquiring the communication frame of time domain from the data inputter of the same layer out of the plurality of layers, the butterfly operation on the communication frame of time domain, and executes, when acquiring the data after the butterfly operation from the data inputter of the same layer out of the plurality of layers, the butterfly operation on the data after the butterfly operation, wherein the communication use determiner determines that the communication use of the communication frame is the control use or determines that the communication use of the communication frame is the information use, and a layer to which the data inputter selected by the selector belongs when the communication use determiner determines that the communication use of the communication frame is the control use is a layer later than a layer to which the data inputter selected by the selector belongs when the communication use determiner determines that the communication use of the communication frame is the information use.

* * * * *